(12) United States Patent
Suda et al.

(10) Patent No.: US 7,195,365 B2
(45) Date of Patent: Mar. 27, 2007

(54) VEHICLE LAMP

(75) Inventors: Yoshihisa Suda, Maebashi (JP); Noboru Kanba, Fujioka (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 63 days.

(21) Appl. No.: 10/671,518

(22) Filed: Sep. 29, 2003

(65) Prior Publication Data
US 2004/0070339 A1  Apr. 15, 2004

(30) Foreign Application Priority Data
Sep. 30, 2002  (JP)  ............................. 2002-286700

(51) Int. Cl.
*F21V 33/00* (2006.01)
(52) U.S. Cl. .................. 362/92; 362/459; 362/507; 362/546; 362/547; 362/465; 219/220; 219/522; 313/15
(58) Field of Classification Search .................. 362/92, 362/459, 507, 546, 465, 547; 313/15; 219/220, 219/522
See application file for complete search history.

(56) References Cited

U.S. PATENT DOCUMENTS 1,925,423 A * 9/1933 Warhus, Jr. et al. ........ 219/220
4,636,331 A    1/1987 Sako et al.
6,371,635 B2   4/2002 Ott et al.
6,601,983 B1 * 8/2003 Runfola et al. ............. 362/545
2002/0096984 A1 * 7/2002 Konishi et al. ............... 313/25

FOREIGN PATENT DOCUMENTS

| DE | 35 24 631 C2 | 6/1986 |
| DE | 40 24 268 A1 | 2/1992 |
| DE | 199 62 214 A1 | 6/2001 |
| DE | 199 63 337 A1 | 7/2001 |
| JP | 5-54201 B2 | 8/1993 |
| JP | 10-289602 A | 10/1998 |
| JP | 2002-93210 A | 3/2002 |
| JP | 2002-150812 A | 5/2002 |

* cited by examiner

*Primary Examiner*—Stephen Husar
*Assistant Examiner*—Meghan K. Dunwiddie
(74) *Attorney, Agent, or Firm*—Foley and Lardner LLP

(57) ABSTRACT

Disclosed is a vehicle lamp that is designed to reliably remove snow, etc. adhering to a lens. A carbon-based heating element is mounted within a lamp body so that the heat rays radiated from the heating element irradiate a rear surface of the lens.

4 Claims, 1 Drawing Sheet

VEHICLE LAMP

BACKGROUND OF THE INVENTION

1. Field of the Invention

The present invention relates to a vehicle lamp for use on a vehicle such as an automobile and, more particularly, to a vehicle lamp equipped with a provision for melting snow, or the like, adhering to a lens surface.

2. Description of the Related Art

Traditionally, headlights for vehicles such as automobiles have been constructed using incandescent halogen lamps; in the case of such headlights, if snow or ice adheres to the headlights, the snow or ice is melted away by the heat generated from the lamps, because the lamps generate a large amount of heat when producing light for illumination.

In recent years, however, HID lamps (High Intensity Discharge lamps), which have a higher luminous efficacy than conventional light bulbs and halogen lamps and have the characteristic of being able to produce bright light with low power consumption, have come to be used widely as light sources for automobile headlights. However, when an HID lamp is used as the light source, there occurs the phenomenon that the lens surface temperature does not rise much, because the amount of heat generation is low while the luminous efficacy is high. As a result, when the automobile is running while it is snowing, snow or ice adhering to the lens surface is not melted, and the snow or the like builds up on the lens surface; the resulting problem is that the lighting intensity, and hence the visibility, drops, leading to an extremely dangerous driving condition.

In view of this, the prior art proposes a method for removing snow, etc. adhering to the lens by scraping it off by means of a wiper or the like; however, depending on the temperature or the snowfall condition, the snow, etc. cannot be removed sufficiently, and any residual snow, etc. is allowed to build up on the lens and the wiper, thus not solving the problem that not enough light can be secured.

SUMMARY OF THE INVENTION

An object of the present invention is to provide a vehicle lamp that is designed to reliably remove snow, etc. adhering to the lens.

According to the present invention, there is provided a vehicle lamp comprising: a lamp body for holding therein a light source; a lens mounted on the front of the lamp body; and a carbon-based heating element mounted within the lamp body so that heat rays radiated from the heating element irradiate a rear surface of the lens.

When the carbon-based heating element, which radiates much energy in the infrared to far-infrared regions and has high heating efficiency, is mounted within the lamp body so that its radiation reaches the lens directly or indirectly via a reflector or the like, snow or ice adhering to the lens can be melted and thus does not build up on the lens, or the snow or ice built up on the lens can be efficiently melted, by the radiated heat directly reaching the snow or ice or by the temperature of the lens efficiently heated when the heating element is energized for heating. Further, not only snow or ice but frost or dew droplets which, if allowed to adhere to the lens, can reduce the intensity of lighting can also be removed by melting and evaporating them either by directly absorbing the wavelengths radiated from the carbon-based heating element or by the temperature of the lens heated by the radiation heat of the carbon-based heating element.

The wavelengths radiated from the carbon-based heating element, though they depend on the heating temperature, lie in the infrared to far-infrared regions, and contain the wavelengths absorbed by a material, such as polycarbonate or other resin material, used for the lens; therefore, the lens can be heated quite effectively. Exactly the same can be said of snow or ice or the like. Accordingly, with the radiation of heat that directly heats the snow or ice by the wavelengths passed through the lens, coupled with the heat conduction of the lens itself heated by absorbing the wavelengths, the snow or ice adhering to the lens can be effectively removed by melting and evaporation.

To produce the carbon-based heating element, a composition that has formability, and that exhibits substantially non-zero carbon residue after firing, is molded into the desired shape, and the resulting molding is then carbonized.

Formability improves if crystalline carbon powder such as carbon black, graphite, or coke powder is mixed into the composition before molding. Furthermore, if metal or metalloid compounds, such as metal carbide, metal boride, metal silicide, metal nitride, metal oxide, metalloid nitride, metalloid oxide, or metalloid carbide, are mixed in proportions that match the target resistivity value of the heating element to be obtained after carbonizing, the carbon-based heating element can be made to have a desired resistivity. As the resistivity can be controlled in this way, limitations on the cross sectional area and length required of the heating element to achieve the resistance value that is determined by the voltage value of the power supply used and the required amount of heat generation are greatly eased, thus making it possible to produce the heating element in any desired shape that matches the purpose of the heating element.

Examples of the composition that has formability, and that exhibits substantially non-zero carbon residue after carbonizing, include: thermoplastic resins such as polyvinyl chloride, polyacrylonitrile, polyvinyl alcohol, polyvinyl chloride-acetate copolymer, and polyamide; thermosetting resins such as phenol resin, furan resin, epoxy resin, unsaturated polyester, and polyimide; natural polymer substances having condensed polycyclic aromatics such as lignin, cellulose, gum tragacanth, gum arabic, sugar, etc. within the basic molecular structure; and synthetic polymer substances having condensed polycyclic aromatics such as formalin condensate of naphthalene sulphonic acid, copna resin, etc. not contained in the above listed substances, within the basic molecular structure. The kind and quantity of the composition used are selected appropriately according to the target shape of the heating element, and a single kind of material or a mixture of two or more kinds of materials may be used; in particular, polyvinyl chloride resin and furan resin are preferred for use.

The heating element may be formed in any suitable shape, such as a coiled shape, a bar shape, a plate shape, or a ring shape.

To prevent oxidation of the carbon-based heating element, the heating element should be sealed within an inert atmosphere, but in applications where the heating element is used, for example, at temperatures lower than 500° C. that do not cause oxidation, the heating element need not necessarily be sealed. In such cases, however, sealing the heating element will ensure more effective electrical insulation, protection, etc.

When sealed, the external lead for power supply may be brought out from only one side or from both sides; further, to ensure the ease of mounting and removal, a screwed based, a non-screwed socket type base, a bayonet type base, or any other suitable type of base may be used.

Furthermore, if the heating element is used under conditions that no light is produced when it is energized, for example, the temperature of the heating element is not higher than 500° C., then no ill effect is caused to the function of the lighting lamp and no light is produced other than from the lighting lamp; as a result, while retaining the merit that the external appearance of the lighted head lamp is not impaired at all, the lens, or snow or ice or the like adhering to the lens, can be heated to melt away the snow or ice or the like adhering to the lens.

A sensor may be used for the lens so that the lens may be heated by energizing the carbon-based heating element when a predetermined temperature is reached.

Figure 1:
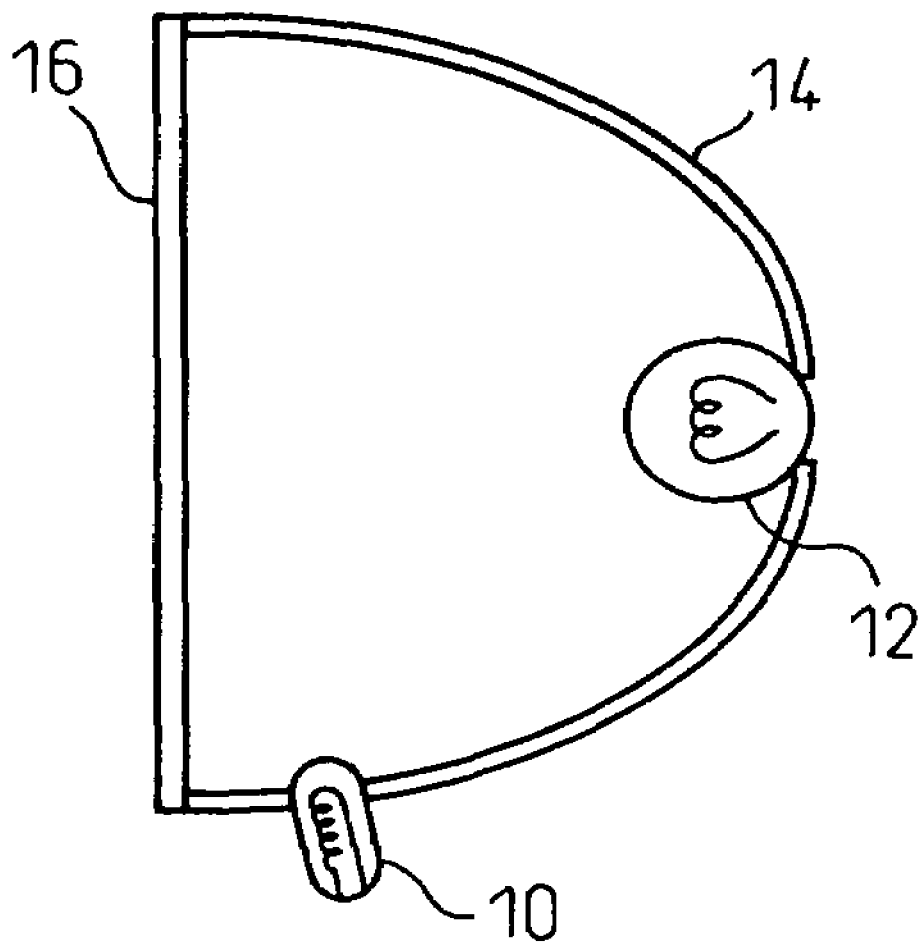
FIG. 1 is a diagram showing a vehicle lamp according to one example of the present invention.

Examples will be described below, but it will be appreciated that the place of installation and the method of installation are not limited to the examples shown here.

EXAMPLES

Example 1

As a carbon-based heating element having high infrared radiation efficiency, a carbon-based coiled heating element was produced in the following manner: 45 parts of chlorinated polyvinyl chloride resin (T-741 manufactured by Nippon Carbide) and 15 parts of furan resin (HITAFURAN VF-302 manufactured by Hitachi Chemical) were mixed together to prepare a mixed resin system, to which 20 parts of natural graphite fine powder (with an average particle size of 5 μm, manufactured by Nippon Graphite) and 20 parts of boron nitride powder (with an average particle size of 5 μm, manufactured by Shin-Etsu Chemical) were added; then, 20 parts of diallyl phthalate monomer, as a plasticizer, were added, dispersed, and mixed, and the resulting composition was molded by extrusion and carbonized in a nitrogen gas atmosphere. A small lamp heater was fabricated by connecting a lead to an end of the heating element and sealing the heating element within a quartz glass filled with an argon gas. As shown in FIG. 1, a vehicle lamp for lighting was produced by embedding the lamp heater 10 in a lower part of a lamp body 14 having an HID lamp 12, the lamp heater being placed near a lens 16 so that the radiated heat would strike the lens.

With the above lamp construction, it becomes possible to melt the snow, ice, etc. adhering to the lens, while satisfying prescribed light distribution characteristics and light intensity requirements, and an inherent problem of the high efficacy HID lamp, which occurs particularly in cold districts, can be solved.

Example 2

As a carbon-based heating element having high infrared radiation efficiency, a carbon-based coiled heating element was produced in the following manner: 45 parts of chlorinated polyvinyl chloride resin (T-741 manufactured by Nippon Carbide) and 15 parts of furan resin (HITAFURAN VF-302 manufactured by Hitachi Chemical) were mixed together to prepare a mixed resin system, to which 20 parts of natural graphite fine powder (with an average particle size of 5 μm, manufactured by Nippon Graphite) were added; then, 20 parts of diallyl phthalate monomer, as a plasticizer, were added, dispersed, and mixed, and the resulting composition was molded by extrusion and carbonized in a nitrogen gas atmosphere. A lamp heater consisting of an annular carbon-based heating element was fabricated by connecting a lead to an end of the heating element and sealing the heating element within an annular quartz glass having substantially the same shape as the peripheral shape of a lens 16. A vehicle lamp for lighting was produced by embedding the lamp heater within a lamp body 14 having an HID lamp, the lamp heater being placed near the lens 16 so that the radiated heat would strike the lens from all directions.

With the above lamp construction, it becomes possible to melt the snow, ice, etc. adhering to the lens, while satisfying prescribed light distribution characteristics and light intensity requirements, and an inherent problem of the high efficacy HID lamp, which occurs particularly in cold districts, can be solved.

The invention claimed is:

1. A vehicle lamp comprising:
    a lamp body for holding therein a lamp;
    a lens mounted on the front of said lamp body; and
    a carbon-based heating element mounted within said lamp body and apart from said lamp and said lens,
    wherein heat rays radiated from said heating element irradiate a rear surface of said lens, and
    wherein the carbon-based heating element does not interrupt light rays from the lamp to the lens.

2. A vehicle lamp according to claim 1, further comprising a glass tube for sealing therein said carbon-based heating element.

3. A vehicle lamp according to claim 1, wherein said carbon-based heating element contains amorphous carbon and carbon powder dispersed in said amorphous carbon.

4. A vehicle lamp according to claim 3, wherein said carbon-based heating element further contains a metal or metalloid compound.

* * * * *